(No Model.)
J. F. & C. J. RUPERT.
NAILLESS HORSESHOE.
No. 600,744. Patented Mar. 15, 1898.
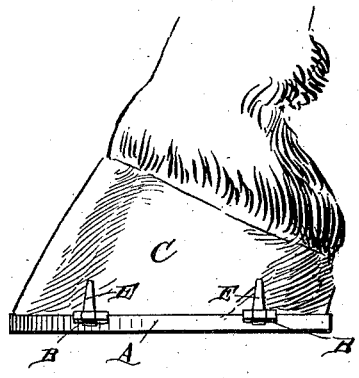
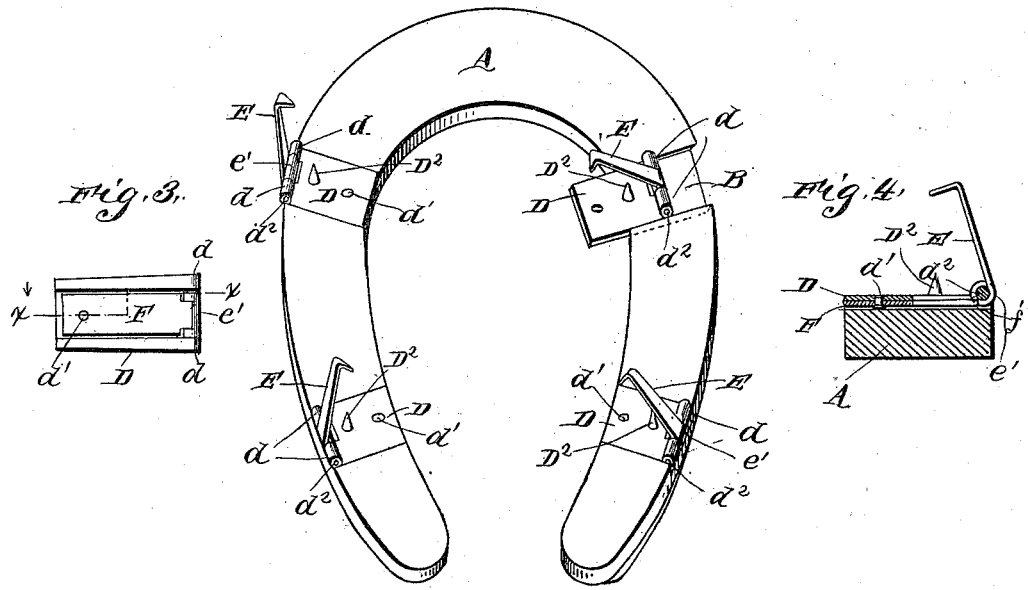
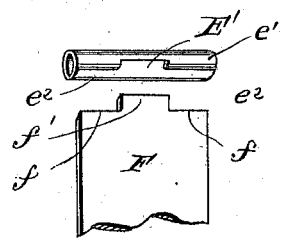
Witnesses:
Inventors
John F. Rupert
Clarence J. Rupert
By their Atty.

UNITED STATES PATENT OFFICE.

JOHN F. RUPERT AND CLARENCE J. RUPERT, OF CONNEAUTVILLE, PENNSYLVANIA.

NAILLESS HORSESHOE.

SPECIFICATION forming part of Letters Patent No. 600,744, dated March 15, 1898.

Application filed April 13, 1897. Serial No. 631,940. (No model.)

*To all whom it may concern:*

Be it known that we, JOHN F. RUPERT and CLARENCE J. RUPERT, citizens of the United States, residing at Conneautville, in the county of Crawford and State of Pennsylvania, have invented certain new and useful Improvements in Horseshoes; and we do hereby declare the following to be a full, clear, and exact description of the invention, such as will enable others skilled in the art to which it appertains to make and use the same.

Our invention relates to improvements in nailless horseshoes; and it consists, substantially, in making the shoe with dovetailed recesses in the upper surface thereof, in which spring-operated hooks are secured adapted to engage with the outside surface of a horse's hoof when the shoe is in place thereon.

The construction and operation of our invention is hereinafter set forth and described, and illustrated in the accompanying drawings, in which—

Figure 1 is a side elevation of a horse's hoof with an improved nailless horseshoe in place thereon. Fig. 2 is a perspective view of our improved nailless horseshoe with one of the hooks partially removed from the dovetailed groove therein. Fig. 3 is a view of the under surface of our improved hook mechanisms. Fig. 4 is a sectional view of the same on the line $x\,x$ in Fig. 3. Fig. 5 is an enlarged detail view of parts of the same in perspective.

In the drawings, A is a horseshoe provided on its upper surface with dovetailed slots B. In these slots are placed removable plates D, on the outer ends of which are ears $d\,d$, and clamp-hooks E, adapted to engage the outside of a horse's hoof C, are pivoted on a pintle $d^2$, passing through an eye $e'$ therein and through the ears $d\,d$ on said plates. On the under side of these plates D are secured springs F by means of rivets $d'$ passing through the rear ends thereof into the plates D, and in the upper face of the plates D there are upwardly-projecting spikes $D^2$, adapted to enter the bottom of a horse's hoof.

The under surface of the eyes $e'$ of the hooks E is cut away, so as to form a flat surface $E'$ in the center thereof, and shoulders $e^2\,e^2$ at each side thereof and the corners of the ends of the springs F are cut away, so as to form abutting surfaces $f\,f$, adapted to engage the shoulders $e^2\,e^2$ and leaving a central tongue $f'$ extending out over the flat surfaces $E'$ on the eyes $e'$ between the shoulders $e^2\,e^2$ thereon, as illustrated in Figs. 3, 4, and 5, so that the end of the tongue $f'$ can be reached to press the spring down and disengage the abutting surfaces $f\,f$ from the shoulders $e^2\,e^2$ on the clamp-hooks E, and thereby release them.

In clamping the shoe to the hoof the shoe is first fitted and the clamp-hooks are then driven into the outside surface of the hoof until the abutting surfaces $f\,f$ on the springs engage with the shoulders $e^2\,e^2$ on the eyes $e'$ thereon. The hooks are then firmly held in place until released in the manner hereinbefore described.

Having thus described our invention, what we claim as new, and desire to secure by Letters Patent of the United States, is—

1. In a nailless horseshoe, a horseshoe having dovetail grooves in the top thereof, removable plates fitting into said dovetail grooves, clamp-hooks pivoted to the outer ends of said plates, and springs secured to the under surfaces of said plates and adapted to engage shoulders on the eyes of the clamp-hooks, substantially as and for the purpose set forth.

2. In a nailless horseshoe, a horseshoe having dovetail grooves in the upper surface thereof, removable plates having ears on the outer ends thereof fitting into the dovetail grooves in the top of the shoe, clamp-hooks pivoted in the ears on said plates, shoulders on the eyes of said clamp-hooks and a flat surface thereon between said shoulders, and springs secured to the under surfaces of said plates, abutting surfaces on said springs adapted to engage the shoulders on the eyes of the clamp-hooks, and tongues between said abutting surfaces adapted to pass over the flat surfaces between the shoulders on the eyes of the clamp-hooks, substantially as and for the purpose set forth.

In testimony whereof we have signed this specification in the presence of two subscribing witnesses.

JOHN F. RUPERT.
CLARENCE J. RUPERT.

Witnesses:
JAMES A. STAGER,
ROSS R. RUPERT.